(12) United States Patent
Eriksson (10) Patent No.: US 8,744,427 B2
(45) Date of Patent: Jun. 3, 2014

(54) RADIO BASE STATION, USER EQUIPMENT AND METHODS THEREIN

(75) Inventor: Erik Eriksson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 191 days.

(21) Appl. No.: 13/256,573

(22) PCT Filed: May 18, 2011

(86) PCT No.: PCT/EP2011/058062
§ 371 (c)(1),
(2), (4) Date: Sep. 14, 2011

(87) PCT Pub. No.: WO2010/107111
PCT Pub. Date: Aug. 16, 2012

(65) Prior Publication Data
US 2012/0202477 A1 Aug. 9, 2012

Related U.S. Application Data (60) Provisional application No. 61/441,120, filed on Feb. 9, 2011.

(51) Int. Cl.
*H04W 4/00* (2009.01)

(52) U.S. Cl.
USPC .................. 455/419; 455/452.2; 455/561

(58) Field of Classification Search
USPC ................. 375/260; 455/452.2, 561, 419
See application file for complete search history.

(56) References Cited

U.S. PATENT DOCUMENTS

| 6,240,275 | B1 | 5/2001 | H'Mimy et al. | |
| 2010/0290548 | A1* | 11/2010 | Hoshino et al. | 375/260 |
| 2011/0014926 | A1* | 1/2011 | Baligh et al. | 455/452.2 |

FOREIGN PATENT DOCUMENTS

| WO | WO 2008/130297 A1 | 10/2008 |
| WO | WO 2009/123515 A1 | 10/2009 |
| WO | WO 2009/140898 A1 | 11/2009 |
| WO | WO 2011/006434 A1 | 1/2011 |

OTHER PUBLICATIONS

PCT International Search Report, mailed Oct. 7, 2011 for PCT International Application No. PCT/EP2011/058062, filed on May 18, 2011.
PCT Written Opinion of the International Searching Authority, mailed Oct. 7, 2011 for PCT International Application No. PCT/EP2011/058062, filed on May 18, 2011.
LG Electronics: "Intra-cell power control for uplink in E-UTRA", 3GPP Draft; R1-073506—Uplink Power Control, 3rd Generation Partnership Project (3GPP), Mobile Competence Centre; 650, Route Des Lucioles; F-06921 Sophia-Antipolis Cedex; France, vol. RAN WG1, no. Athens, Greece; Aug. 15, 2007, ZP050107115.

* cited by examiner

*Primary Examiner* — Myron Wyche
(74) *Attorney, Agent, or Firm* — Myers Bigel Sibley & Sajove (57) ABSTRACT

Embodiments herein relate to a method in a radio base station (12) for communicating with a user equipment (10) over a channel structured in transmission time intervals in a radio communications network. The radio base station (12) identifies an interference situation, associated with a transmission time interval, in the cell (15) from a set of interference situations. The radio base station (12) selects a correction value associated with the identified interference situation. Furthermore, the radio base station (12) determines a radio transmission parameter using the correction value; and transmits information, to the user equipment (10), based on the radio transmission parameter.

22 Claims, 9 Drawing Sheets

RADIO BASE STATION, USER EQUIPMENT AND METHODS THEREIN

CROSS REFERENCE TO RELATED APPLICATIONS

This application is a 35 U.S.C. §371 national stage application of PCT International Application No. PCT/EP2011/058062, filed on 18 May 2011, which itself claims priority to U.S. provisional Patent Application No. 61/441,120, filed 9 Feb. 2011, the disclosure and content of both of which are incorporated by reference herein in their entirety.

TECHNICAL FIELD

Embodiments herein relate to a radio base station, a user equipment and methods for use therein. In particular, embodiments herein relate to communication between the user equipment and the radio base station in a radio communications network.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises radio base stations providing radio coverage over at least one respective geographical area forming a cell. User equipments (UE) are served in the cells by the respective radio base station and are communicating with respective radio base station. The user equipments transmit data over an air interface to the radio base stations in uplink (UL) transmissions and the radio base stations transmit data over an air interface to the user equipments in downlink (DL) transmissions.

In LTE the radio base station decides on the transport parameters or format including modulation and code rate to use for all data transmissions but may also be assisted in its choice of transport parameters by terminal or user equipment reports. One of the reports available is the Channel Quality Indicator (CQI) report. In the CQI report the UE indicates a suggested modulation and coding to use given the current radio condition, considering both signal and interferences strength. Making accurate CQI estimates in a UE is difficult and costly, hence the system must compensate for errors in the CQI. Errors in CQI can also reside from offset in interference between symbols used for channel estimation and symbols used for data transmissions, referred to as interference mismatch. An additional error comes from the time delay between CQI estimation before the report is available in the radio base station.

In order to compensate for the errors in CQI an outer-loop may be applied. The outer-loop takes in additional feedback from Automatic Repeat Request (ARQ) protocols like the Hybrid ARQ (HARQ) or the Radio Link Control Acknowledged. Mode (RLC AM) in LTE, and uses that additional feedback to calculate a correction value also called back-off value to the estimated channel quality based on deviation from expected error rate.

With packet oriented systems, such as LTE, one issue with the channel estimation for data transmission is the fast varying interference situation. The interference variations due to varying load in neighboring cells can be handled in two different ways; if no communication to the other cell is possible the transport format selection must take the additional variations into account, by applying a larger back-off value or by other means. If fast communication between cells is possible interference prediction can be applied. A common way to compensate for the interference error is to base the correction value on UE estimated path-loss measurements to the neighboring cell. This can in situations with large interference variations show significant throughput gains compared to uncoordinated systems. Large gains can be achieved by coordinating the interfering cells in a LTE system. Updated channel quality estimates may be made by converting CQI estimates to Signal to Interference plus Noise ratio (SINR) estimates and then update the channel quality values according to the new interference situation given that the path loss to the own and neighboring cells are known. Path loss to neighboring cells can in LTE be calculated from Received Signal Reference Power (RSRP) measurements designed for handover control. An RSRP report may comprise a filtered estimate of the received power from neighboring cells.

A problem with compensating CQI using RSRP is that RSRP reports also contain errors and it also takes time for the UE to make the required estimates so it may take hundreds of ms before the RSRP reports are available in the radio base station. Thus, the performance of the radio communication network is reduced due to the delay and that the RSRP report comprises errors.

SUMMARY

An object of embodiments is to resolve at least the problems stated above for increasing the performance of the radio communications network.

According to a first aspect of embodiments herein the object is achieved by a method in a radio base station for communicating with a user equipment over a channel structured in transmission time intervals in a radio communications network. The user equipment is served in a cell controlled by the radio base station. The method comprises identifying an interference situation in the cell from a set of interference situations. The interference situation is associated with a transmission time interval. The method further comprises selecting a correction value associated with the identified interference situation. The method further comprises determining a radio transmission parameter using the selected correction value, and transmitting information, to the user equipment, based on the determined radio transmission parameter.

According to another aspect of embodiments herein the object is achieved by providing a radio base station for communicating with a user equipment over a channel structured in transmission time intervals in a radio communications network. The radio base station is arranged to control a cell serving the user equipment. The radio base station comprises a processing circuit configured to identify the interference situation, associated with a transmission time interval, in the cell from a set of interference situations. The processing circuit is further configured to select a correction value associated with the identified interference situation, and to determine a radio transmission parameter using the selected correction value. The radio base station further comprises a transmitter configured to transmit information, to the user equipment, based on the determined radio transmission parameter.

According to another aspect of embodiments herein the object is achieved by a method in a user equipment for communicating with a radio base station over a channel structured in transmission time intervals in a radio communications network. The method comprises transmitting a scheduling request to the radio base station according to the above, and receives a scheduling grant from the radio base station. The scheduling grant indicates a radio transmission parameter. The method furthermore comprises transmitting, to the radio base station, data using the received radio transmission parameter.

According to another aspect of embodiments herein the object is achieved by providing user equipment for communicating with a radio base station over a channel structured in transmission time intervals in a radio communications network. The user equipment comprises a transmitter configured to transmit a scheduling request to the radio base station according to the above. The user equipment further comprises a receiver configured to receive a scheduling grant from the radio base station, indicating a radio transmission parameter. The transmitter is further configured to transmit, to the radio base station, data using the received radio transmission parameter.

In some embodiments herein the concept of error correcting process of radio transmission parameters, such as outer loops, is extended to correct errors by applying different instances of correction values dependent on identified interference situation out of a set of interference situations. In some embodiments the used correction value is updated based on a result of a transmission using the corrected radio transmission parameters. The interference situation identified may be based on active transmitters, precoding/beam forming/rank in e.g. a neighbouring cell, and/or Multi User-Multiple Input Multiple Output (MU-MIMO) orthogonality in a present cell.

An advantage achieved by the embodiments is that by using a correction value based on an identified interference situation out of a number of interference situations a more accurate correction value is used in a quicker manner depending on the situation and the performance of the radio communications network is improved.

BRIEF DESCRIPTION OF THE DRAWINGS

Embodiments will now be described in more detail in relation to the enclosed drawings, in which.

DETAILED DESCRIPTION

Figure 1:
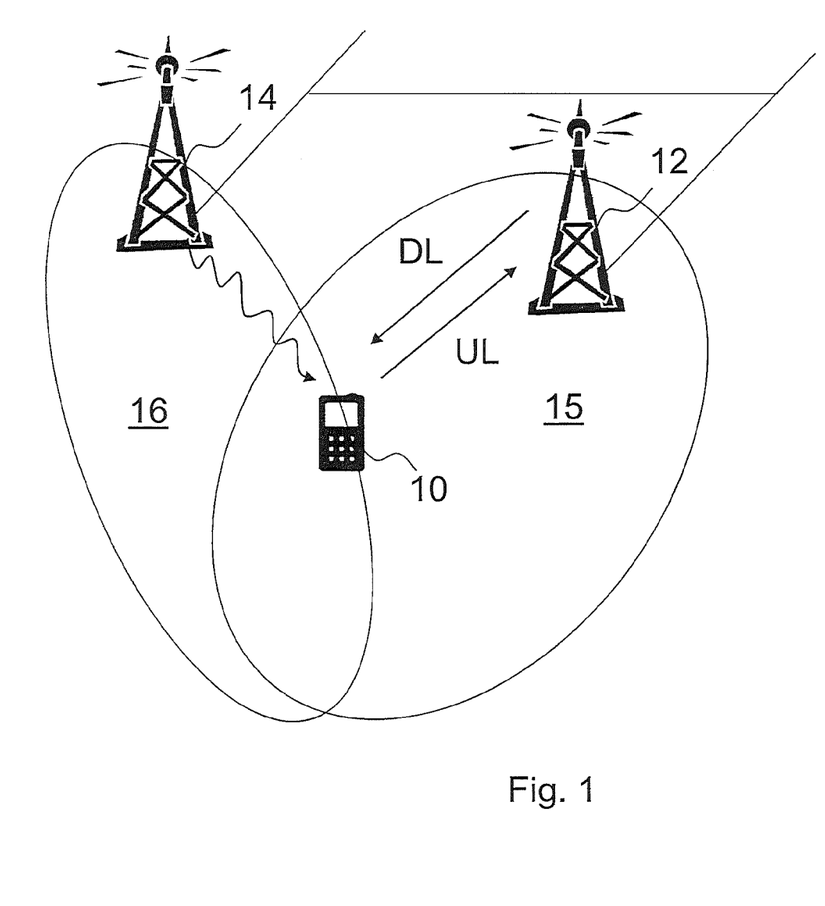
FIG. 1 is a schematic overview of a radio communications network.

FIG. 1 discloses a schematic overview of a radio communications network using a radio technology, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The radio communications network comprises a first radio base station 12 and a second radio base station 14, each providing radio coverage over at least one respective geographical area forming a first cell 15 respective a second cell 16. A user equipment 10 is served in the first cell 15 by the first radio base station 12 and is communicating with the first radio base station 12. The user equipment 10 transmits data over an air interface to the first radio base station 12 in uplink (UL) transmissions and the first radio base station 12 transmits data over an air interface to the user equipment 10 in downlink (DL) transmissions. The communications between user equipments and radio base stations are carried over a channel structured in transmission time intervals.

According to embodiments herein the radio base station 12 identifies an interference situation in the first cell 15 from a set of interference situations. The interference situation is associated with a transmission time interval, e.g. the inference situation is occurring over, during, in, for the transmission time interval. The radio base station 12 selects a correction value associated with said interference situation. The radio base station 12 then determines, e.g. computes, a radio transmission parameter using the correction value. The radio transmission parameter is in some embodiments used to transmit data to the user equipment 10 and in some embodiments is to be used by the user equipment 10 to transmit data to the radio base station 12. In the latter case, the transmission parameter is transmitted to the user equipment 10 and the user equipment 10 then uses the received transmission parameter to transmit data to the radio base station 12. In either case, the radio base station 12 transmits information, to the user equipment 10, based on the radio transmission parameter.

In some embodiments herein, a set is provided of different correction values, each connected to an index in the first radio base station 12. Each index corresponds to an identified interference situation. The first radio base station 12 then applies a correction value, which also may be referred to as a back off value, associated with the identified or expected interference situation for the transmission at hand, e.g. for the transmission time interval. The correction value may be a correction in Channel Quality Indicator (CQI) correction value, Signal to Interference plus Noise Ratio (SINR) correction value, Modulation and Coding Scheme (MCS) correction value or similar. In some embodiments regarding a DL transmission, when feedback from that DL transmission later is fed back from the receiver, i.e. the user equipment 10, the same index may be updated with a new value dependent on the outcome of the transmission. In some embodiments regarding an UL transmission, the radio base station 12 may evaluate the UL transmission and update the same index with a new value dependent on a result of the evaluation. An interference situation may be associated with all, a subset, or different groupings of the combinations of different transmission parameters used in a set of coordinated cells, i.e. cells from with radio base station 12 may receive information of used transmission parameters associated with the transmission time interval. The transmission parameters of the received information may comprise for example: on/off information of transmitters; transmission power; precoding, beam-forming, rank information; whereas the determined radio transmission parameter or parameters may be radio transmission parameters used based on CQI, SINR, MCS.

Figure 2:
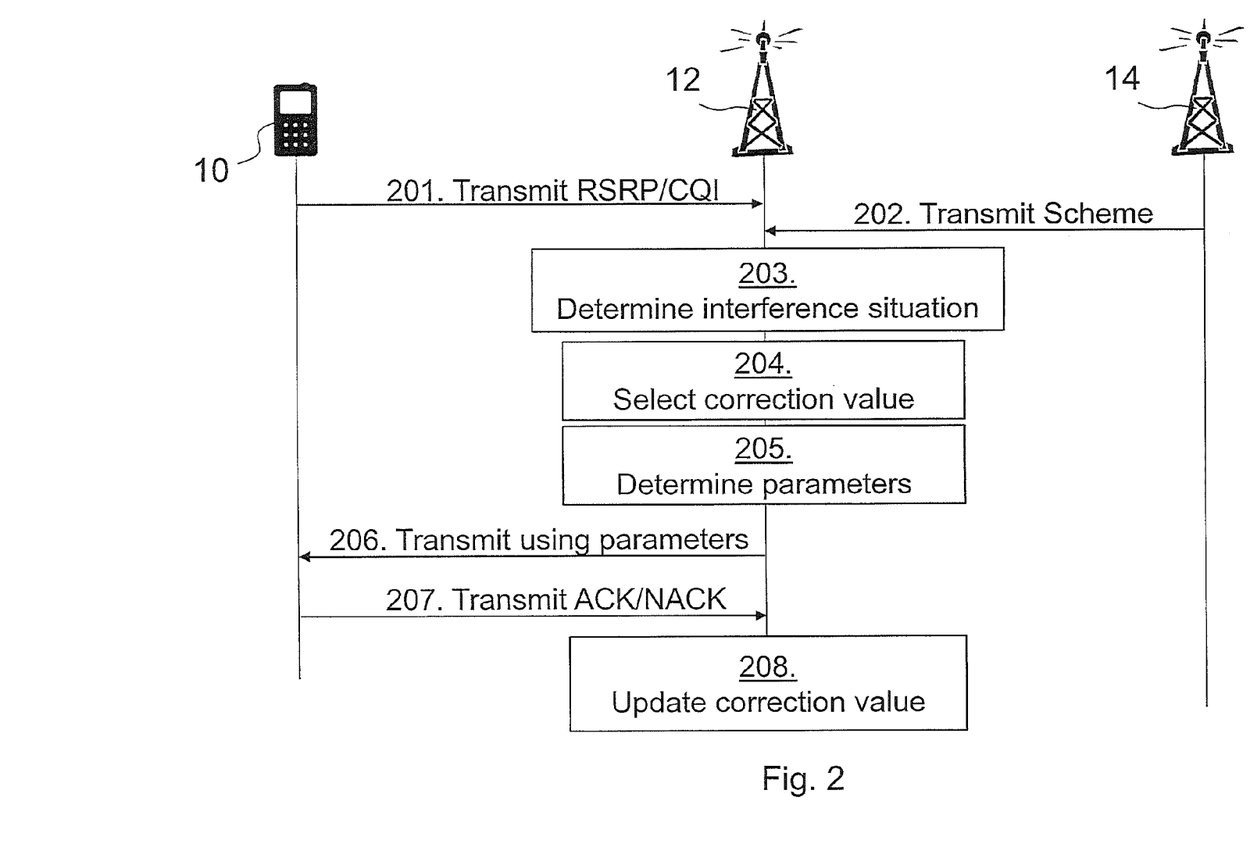
FIG. 2 is a combined schematic flowchart and signalling scheme in accordance with some embodiments.

FIG. 2 is a combined flowchart and signaling scheme in the radio communications network depicting embodiments herein. The steps may be taken in any suitable order.

Step 201. The user equipment 10 may transmit a RSRP measurement or a CQI report to the first radio base station 12. The RSRP or the CQI may be measured on a reference signal. The RSRP is an average of the power of all resource elements which carry cell-specific reference signals over the entire bandwidth. It may therefore be measured in the Orthogonal Frequency Division Modulation (OFDM) symbols carrying reference symbols. A Reference Signal Reported Quality (RSRQ) measurement provides additional information when RSRP is not sufficient to make a reliable handover or cell reselection decision. RSRQ is a ratio between the RSRP and the Received Signal Strength Indicator (RSSI). RSSI is a total received power including all interferences and thermal noises. As RSRQ combines signal strength as well as interference level, this measurement value provides additional help for mobility decisions. The CQI is based on the difference of the received power of a reference signal and an indicated transmission power from the first radio base station 12.

Step 202. The second radio base station 14 may inform the first radio base station 12 of a transmission scheme in the second cell 16. The transmission scheme may e.g. indicate active transmitters associated with a transmission time interval. In the case the first radio base station 12 controls both the first cell 15 and the second cell 16 this is not performed.

Step 203. The first radio base station 12 then identifies or predicts the interference situation out of a number of interference situations based on the received transmission scheme from the second radio base station 14 and/or a transmission scheme in the first cell 15. For example, the interference situation in the time transmission interval may be identified based on active transmitters; precoding, beam forming, rank in a neighboring cell; and/or Multi User-Multiple Input Multiple Output (MU-MIMO) orthogonality in the present cell.

Step 204. The first radio base station 12 selects a correction value of e.g. a SINR or a CQI of the RSRP measurement or the CQI report based on the identified or predicted interference situation, for example, a correction value of 1 dB or similar.

Step 205. The first radio base station 12 uses the selected correction value to determine e.g. by calculating, a radio transmission parameter or parameters for the transmission comprising, for example, modulation, code rate, rank and/or precoding. The determined radio transmission parameter or parameters are herein after referred to as the radio transmission parameter.

Step 206. The first radio base station 12 then performs a DL transmission of data in the time transmission interval to the user equipment 10 in the cell 15 using the calculated radio transmission parameter.

Step 207. The user equipment 10 receives the data and may transmit one or a number of Automatic Repeat Request (ARQ) messages based on whether reception of the data was successful or not. The user equipment 10 may e.g. transmit Acknowledgements (ACK), non-acknowledgements (NACKs) or perform a Discontinuous Transmission (DTX), where DTX indicates a non-successful reception.

Step 208. The first radio base station 12 may, based on the ARQ message, update the selected correction value. For example, if the first radio base station 12 receives a plurality of NACKs for the transmission, the selected correction value may be updated to a larger value indicating more interference than based on the identified/predicted interference situation.

Figure 3:
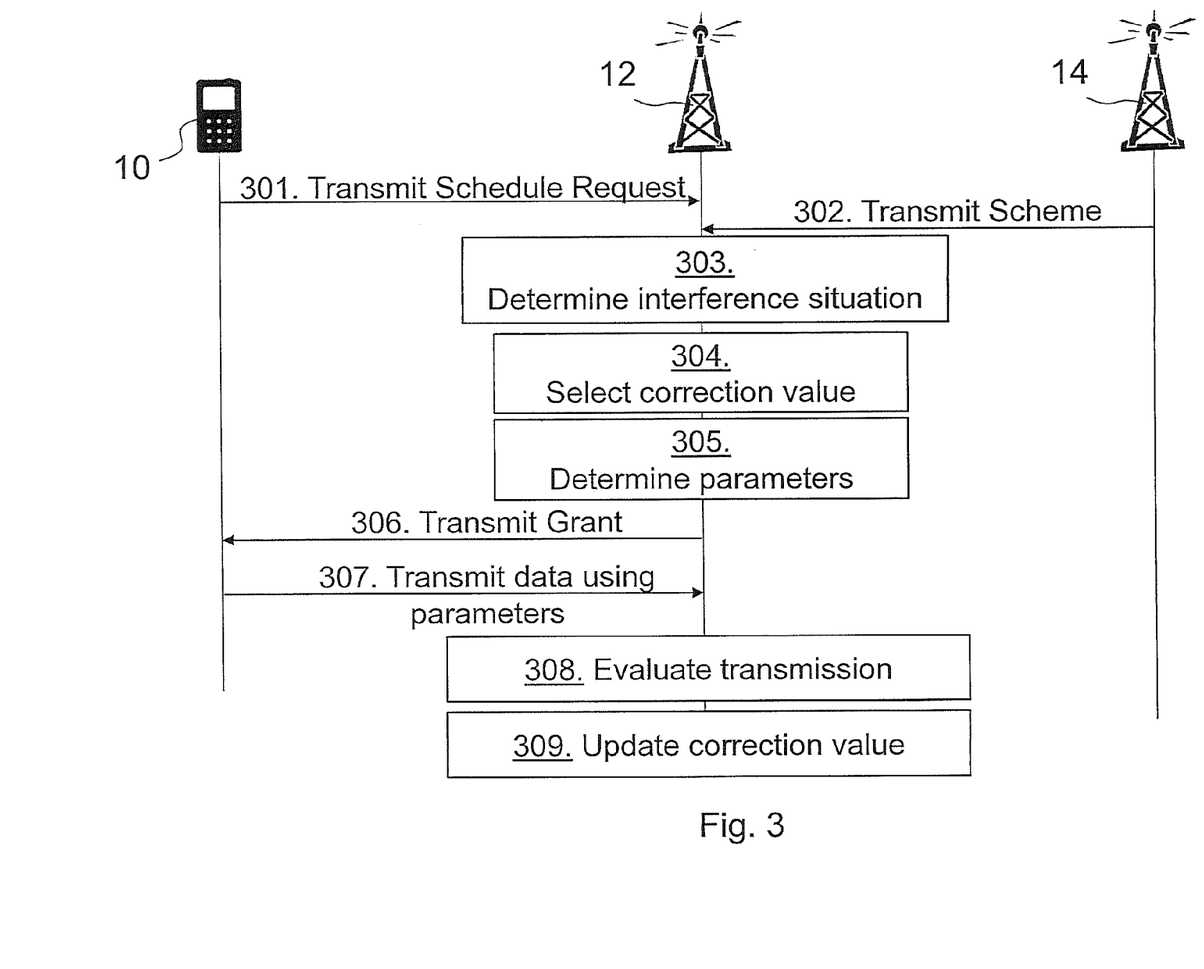
FIG. 3 is a combined schematic flowchart and signalling scheme in accordance with some embodiments.

FIG. 3 is a combined flowchart and signaling scheme of some further embodiments in the radio communications network. The steps may be taken in any suitable order.

Step 301. The user equipment 10 may transmit a scheduling request to the first radio base station 12. The scheduling request may comprise an indication that the user equipment 10 requests uplink radio resources. The first radio base station 12 receives the scheduling request and schedules a transmission from the user equipment 10 to take place over a Transmission Time Interval (TTI).

Step 302. The second radio base station 14 may inform the first radio base station 12 of a transmission scheme in the second cell 16. The transmission scheme may indicate beamforming parameter of a TTI, active TTIs, transmission power over a TTI or similar, which TTI may correspond to the TTI scheduled to the user equipment 10.

Step 303. The first radio base station 12 then identifies the interference situation based on the received information, from the second radio base station 14 or from the second cell 16 if being served by the first radio base station 12, associated with the TTI scheduled to the user equipment 10. The interference situation is identified from a set of interference situations. As stated in step 203, the interference situation may also be based on transmission scheme in the first cell 15.

Step 304. The first radio base station 12 then selects a correction value of e.g. SINR or CQI of received transmission measured at the first radio base station 12, based on the identified interference situation.

Step 305. The first radio base station 12 uses the correction value to determine e.g. by calculating, a radio transmission parameter for the transmission from the user equipment 10 to the radio base station 12 comprising, for example, modulation, code rate, rank and/or precoding.

Step 306. The calculated radio transmission parameter may be transmitted to the user equipment 10 in a downlink control information (DCI) format over a downlink control channel. For example, the first radio base station 12 may then transmit a scheduling grant to the user equipment 10 in the first cell 15, which grant indicates the parameter/s to be used. The first radio base station 12 may use the uplink scheduling grant, e.g. DCI format 0, to inform the user equipment 10 about resource block (RB) assignment, modulation and coding scheme to be used.

Step 307. The user equipment 10 may then transmit data using the radio transmission parameter in the scheduling grant.

Step 308. When the first radio base station 12 has received the data it evaluates the received data by e.g. measuring signal strength, determining whether it is received correctly or not, and/or other ways to determine if the transmission from the user equipment is satisfactory. The signal strength may indicate whether the correction value is too large or too small.

Step 309. The first radio base station 12 then updates the correction value based on the result of the evaluation e.g. if the evaluation in step 308 indicates that the correction value need to be updated. For example, if the signal strength is below a threshold value, amount of data is not received correctly, or similarly, the correction value is updated to a larger value.

Note that even if the description is given for a 3GPP LTE system embodiments herein are applicable to any system employing both ARQ protocols and system based transmission control, rate or power control.

Figure 4A:
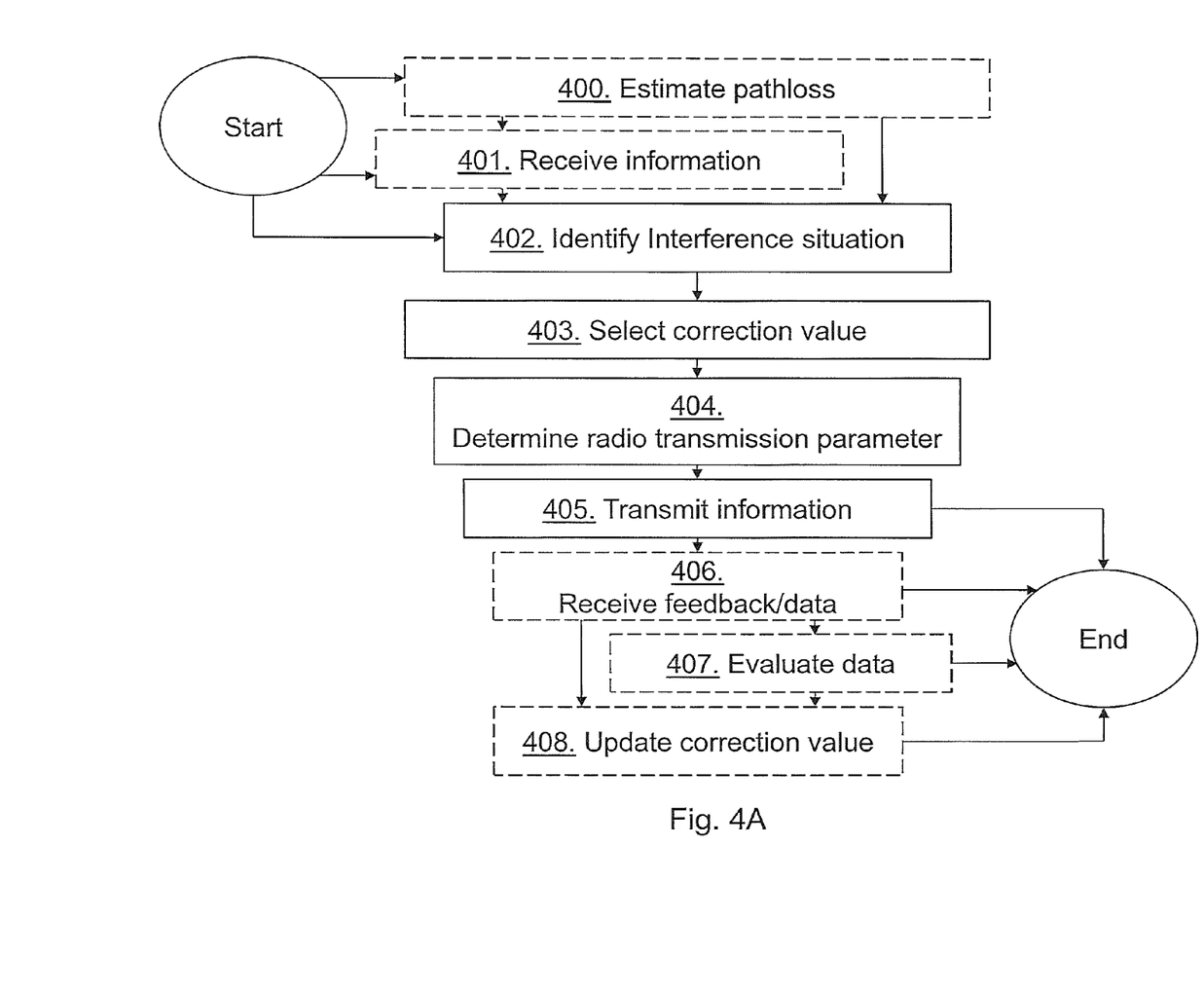
FIGS. 4A-4B depict flowcharts of a method in a radio base station in accordance with embodiments.

The method steps in the first radio base station 12 for communicating with a user equipment over a channel structured in transmission time intervals in a radio communications network according to some embodiments will now be described with reference to a flowchart depicted in FIG. 4A. The user equipment 10 is served in a cell 15 controlled by the radio base station 12. The first radio base station 12 is referred to below as the radio base station 12. The steps do not have to be taken in the order stated below, but may be taken in any suitable order.

Step 400. The radio base station 12 may estimate a pathloss to the user equipment 10. Some embodiments herein disclose an outer-loop with enhanced coordinated interference prediction. Outer-loop herein means some type of system that uses feedback to correct a prediction. Interference prediction may be done based on path-loss estimates from the user equipment 10. The benefit of this method, compared to the correction stated above based only on the outer loop, is that it does not have to wait for the outer loops to converge. With these embodiments the current solution is applied together with a path-loss based predictor, wherein the path-loss based predictor is used as a start estimator and the implementation of the function to identify the interference situation is used as a fine tuning step to an accurate correction value.

The implementation of such an embodiment may comprise a predictor step 400 and a selection step 403, where the predictor estimates the new SINR based on for example active transmitters and an outer-loop correction value is then applied based on the potential erroneous path-loss estimates. In an implementation the method described above for correction is applied. Further extensions comprise coordination between active transmitters at time of transmission and active transmitters at time of CQI estimation. In this extension may one outer-loop be applied for correcting errors in CQI estimation and different instances are applied to correct errors in path-loss estimates.

This step is performed in some embodiments as indicated by the dashed line.

Step 401. The radio base station 12 may in some embodiments receive information regarding active cells and/or active user equipments. Additionally or alternatively, the radio base station 12 may receive information on a transmission scheme being used by the active cells and/or active user equipments. In some embodiments, the radio base station 12 may receive the information from surrounding radio base stations and/or receiving the information from within the radio base station 12. Information on transmission scheme may comprise a power level, a precoding, a rank and/or a beamforming being used by the active cells and/or active user equipments. This step is performed in some embodiments as indicated by the dashed line. Embodiments herein describe how embodiments may be applied in an interference coordination system, e.g. outer-loop only correction for coordinated interference prediction, wherein only outer loops are used to determine the radio transmission parameter, or outer-loop combined with channel estimates, wherein channel estimates in combination with outer loops are used to determine the radio transmission parameter.

In interference coordinated system the first radio base station 12 knows which neighbors are active in a specific Transmission Time Interval, TTI. This information may be obtained from surrounding cells, e.g. from the second radio base station 14, via a low latency communication protocol, e.g. an X2 application protocol. The hardware for multiple antenna locations may e.g. be co-located using radio over fiber out to different sites. It is also possible to have fiber connections between sites to communicate scheduling decisions. In case the delay on the communication line is to long for fast adaptation, it is possible to make pre-assumptions in the different cells and distribute them to acquire estimates of the interference situation.

Step 402. The radio base station 12 identifies an interference situation in the cell 15, referred to above as the first cell 15, from a set of interference situations. The interference situation is associated with a transmission time interval. The set of interference situations may comprise a set of multiple defined interference situations. In some embodiments the radio base station 12 identifies the interference situation based on the received information in step 401.

In some interference coordinated systems the radio base station 12 knows in neighbor cells which radio base stations and/or user equipments that are active in a TTI. This information may be obtained from e.g. surrounding cells via a low latency communication protocol, e.g. an X2 application protocol. It is also possible to make pre-assumptions in the different cells of the usage of TTIs and distribute them to acquire estimates of the interference situation.

In some embodiments herein the interference situation is based on received transmission parameters. Thus, these embodiments do not only identify different interference situations based on what interference sources that are active or not but also divide them based on what transmission scheme that is used. I.e. the base station apply different outer-loop instances dependent on what power levels, precoding, rank or beam-forming the interfering cell, e.g. the second cell 16, is using. Also with these embodiments the number of potential instances may be limited by grouping interference situation based on beam-forming direction independent of phase-shift for example. This may for example be applied within a single radio base station controlling multiple cells. A specific use case is then to identify different interference situations based on if the other cells are active or not and on what precoding that is used, where a user equipment on the edge between two cells may experience substantially different interference dependent on if the neighboring cell uses a beam-forming towards the corresponding direction or some other direction.

A special case of embodiments herein is when the serving cell, e.g. the cell 15, also is the interfering cell. This is the case in Multi User (MU)—Multiple Input Multiple Output (MIMO), where multiple user equipments are addressed at the same time on the same time/frequency/code resources. Different instances of an outer-loop may then be applied dependent on if a co-scheduled user equipment is present or not and also based on what precoding is used to address the co-scheduled user equipment. As an example one index may be assigned to each possible precoding, in another example are the precodings grouped based on resulting beam-forming direction and an index is assigned per group. In these embodiments the different correction values may, dependent on precoding or precoding group, also be used by a scheduler to decide on whether to co-schedule two user equipments or not.

Step 403. The radio base station 12 selects a correction value associated with the identified interference situation.

In some embodiments, the interference situation is associated with a certain open loop index which in its turn is indicating a certain correction value. Thus, the radio base station 12 may comprises a list of a plurality of open loop indices. The number of outer-loop indices or instances may either be all possible cell or user equipment combinations within a set of coordinated cells or a given subset thereof. One specific subset may be obtained by sorting neighboring cells or user equipments in the neighboring cell in an order of interference strength to the user equipment 10 or the radio base station 12. This sorting may be based on Reference Signal Received Power (RSRP) measurements from the user equipment 10, position related information of the user equipment 10 and/or cell statistics such as handover statistics or planning tool output as example.

In some embodiments the radio base station 12 selects a correction value from a number of correction values associated with different interference situations, and wherein the correction value being a Signal to Interference and Noise ratio correction value, a Channel Quality Indicator correction value, and/or a Modulation and Coding Scheme correction value.

When first estimating a pathloss, the radio base station 12 may select, based on the estimated pathloss, an initial correction value, and the selection of the correction value is based on a combination of the initial correction value and the identified interference situation.

Embodiments herein may be applied by associating one index, also referred to as an outer-loop index, and thus one correction value with a specific pattern of active cells and/or active user equipments obtained from a central coordination unit or distributed from the respective cell. The patterns, and the number of outer-loop instances, may either be all possible cell/user equipment combination within the set of coordinated cells or a given subset thereof.

One specific subset is achieved by sorting the neighboring cells, e.g. the second cell 16, or user equipments in the second cell 16 in order of interference strength to the user equipment 10 or the first radio base station 12. This sorting may be based on Reference Signal Received Power (RSRP) measurements from the user equipment 10, position related information of the user equipment 10 where look-up tables may be used and/or cell statistics such as handover statistics or planning tool output as example. The outer-loop index to use is then given by the list index of a first active or transmitting cell e.g. the second cell 16, in the list. In some embodiments only the cell-combinations {{1, -, -, . . . , -}, {0, 1, . . . , -} . . . {0, 0, . . . , 0, 1},} . . . {0, 0, . . . , 0, 0}} are used. Combination {1, -, -, . . . , -} means that the strongest neighbour cell is active and the rest is disregarded; {0, 1, . . . , -} means that the strongest neighbour cell is quiet but the second strongest is active and the rest is disregarded; {0, 0, . . . , 0, 1} means that the least strongest is active; and {0, 0, . . . , 0, 0} means that all neighbors are quiet.

To further limit the set of combinations only the significant cells may be included in the set. A cell/user equipment is determined significant if the interference strength from that cell/user equipment is by a magnitude larger than the interference and noise experiences from outside the set of coordinated cells, e.g. a measured noise floor, a pre-set threshold or similar. The reasons to limit the number of sets are to save memory in the first radio base station 12 and to shorten a convergence time by having more feedback per instance.

In a further extension to improve the convergence time to be decreased by utilizing the knowledge of the order of magnitude in the different correction instances where a lower index never should have a lower correction value than a higher, that experience less interference. This is in practice applied by, when decreasing a correction value, also decreasing the correction for higher indexes if larger than the resulting decreased correction value for the lower index.

A benefit of these schemes is that the schemes do not rely on accuracy in the estimates of path-loss to neighboring cells.

Step 404. The radio base station 12 determines a radio transmission parameter using the selected correction value by e.g. computing one or more radio transmission parameters. The determined radio transmission parameter is to be used to transmit from the user equipment 10 or from the radio base station 12, i.e. when communicating between the user equipment 10 and the radio base station 12. The radio base station 12 may compute the radio transmission parameter by using a first value and combine it with the correction value. The first value may be a pre-set value or a value based on channel estimates.

Step 405. The radio base station 12 transmits information, to the user equipment 10, based on the determined radio transmission parameter. In some embodiments the radio base station 12 transmits information being downlink data using the determined radio transmission parameter. In some embodiments, the radio base station 12 transmits information being a message comprising the determined radio transmission parameter enabling the user equipment 10 to transmit uplink data to the radio base station 12 in the transmission time interval.

Step 406. The radio base station 12 may receive feedback from the user equipment 10, which feedback indicates whether the transmitted downlink data was correctly received or not at the user equipment 10. In some embodiments the radio base station 12 may receive a feedback of the transmission, such as a ARQ, Hybrid ARQ (HARQ), RLC AM feedback, or similar. In some embodiments the radio base station 12 may receive the uplink data from the user equipment 10, said uplink data received is in response to the transmitted message including the determined radio transmission parameter. This step is performed in some embodiments as indicated by the dashed line.

Step 407. In some embodiments, the radio base station 12 evaluates whether the uplink data is received correctly or not, or whether the signal strength of the received data is satisfactory. Thus, the radio base station 12 may determine whether transmission from the user equipment 10 is satisfactory. This step is performed in some embodiments as indicated by the dashed line.

Step 408. In some embodiments the radio base station 12 updates the selected correction value based on the received feedback from the user equipment 10. Thus, the feedback may then be used to update said correction value based on feedback associated with said transmission. In some embodiments, the radio base station 12 updates the selected correction value based on a result of the evaluation. This step is performed in some embodiments as indicated by the dashed line.

In some embodiments the radio base station 12 may further update at least one additional entry of a correction value out of a number of correction values other than the selected correction value. For example, a first interference situation comprises a first number of active transmitters for a TTI, and a second interference situation comprises a second number of active transmitters associated for the TTI. The second number is larger than the first number of active transmitters. The radio base station 12 may identify the first interference situation based on reports from e.g. the second radio base station 14, and initially use a first correction value, e.g. 2 dB, associated with the first interference situation. If the transmission fails a second correction value, e.g. 3 dB, may be used and the second correction value is set as the initial value associated to the first interference situation. The first radio base station 12 may then, based on prior knowledge of the relation, e.g. interference level, between the first correction value of the first interference situation and a third correction value, e.g. 3 dB, of the second interference situation, update also the third correction value associated with the second interference situation. Thus, as the first correction value is updated with 1 dB the third correction value may also be updated to a fourth correction value, e.g. 4 dB. This way of updating plurality of correction values may shorten the time to converge towards a satisfactory transmission, as stated in step 403.

An advantage of embodiments herein is that it enables correction of multiple estimation errors creating mismatch between estimated and experienced interference. This in turn results in better link adaptation in the radio base station 12, giving lower error-rates improved spectral efficiency and higher bitrates.

Note that even if the description is given for a 3GPP LTE system the embodiments herein is applicable to any system employing both ARQ protocols and system based transmission control, rate or power control.

Figure 4B:
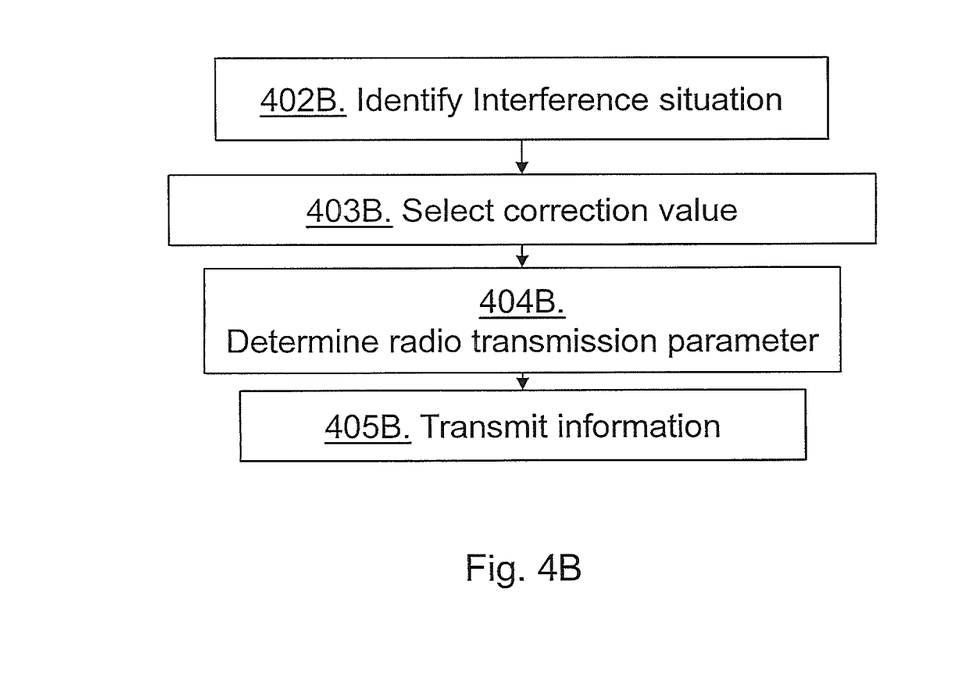

FIG. 4B illustrates the main steps performed by the radio base station 12 in accordance with the previously described embodiments. The user equipment 10 is served in the cell 15 which is controlled by the radio base station 12. The radio base station 12 performs the following steps:

Step 402B. The radio base station 12 identifies an interference situation in the cell 15, from a set of interference situations. The interference situation is associated with a transmission time interval.

Step 403B. The radio base station 12 selects a correction value associated with the identified interference situation.

Step 404B. The radio base station 12 determines a radio transmission parameter using the selected correction value.

Step 405B. The radio base station 12 transmits information, to the user equipment 10, based on the determined radio transmission parameter.

Figure 5:
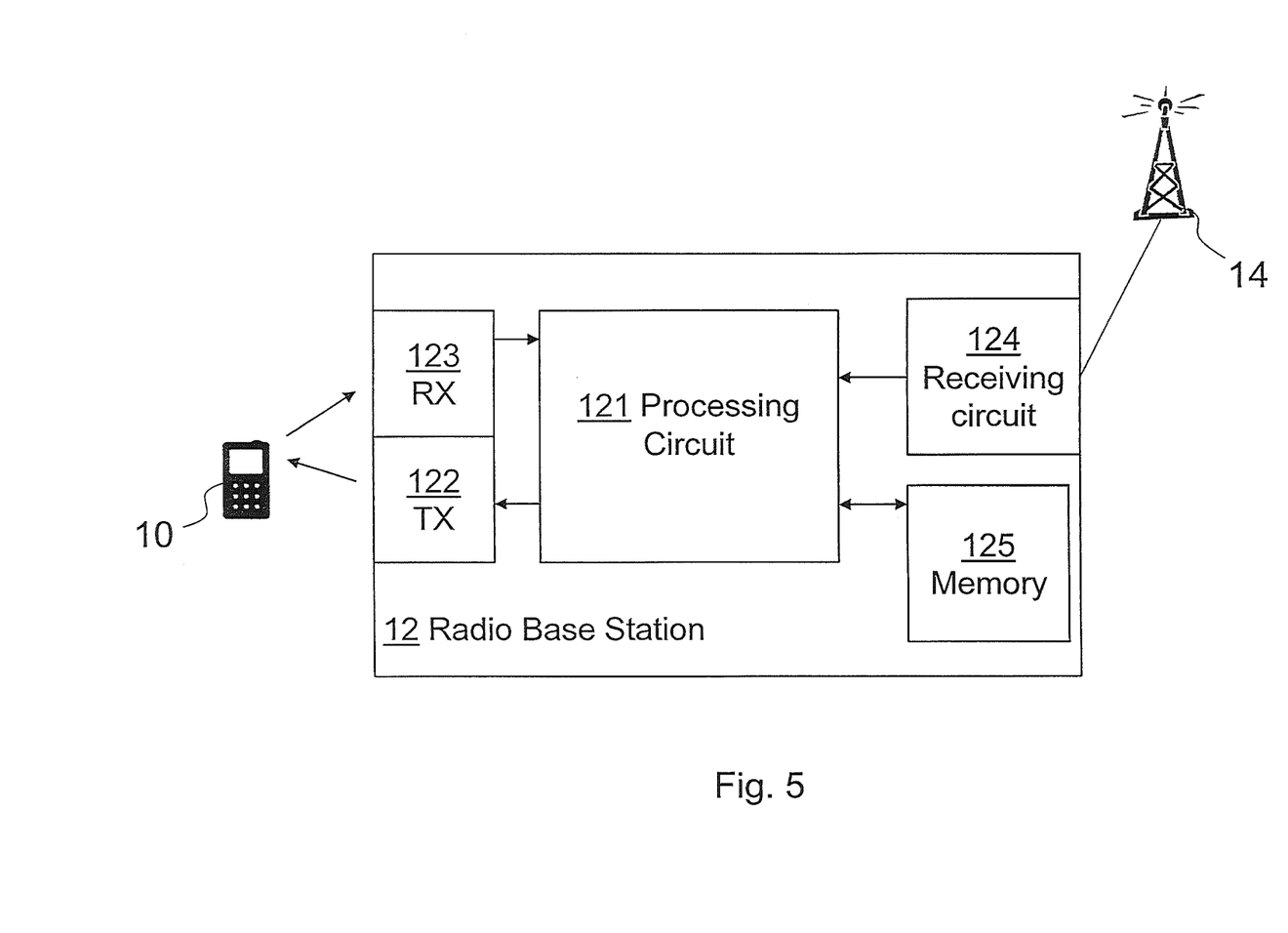
FIG. 5 is a schematic overview of a radio base station in accordance with embodiments.

To perform the method steps above, the radio base station 12 comprises an arrangement depicted in FIG. 5. FIG. 5 depicts the radio base station 12 for communicating with a user equipment 10 over a channel structured in transmission time intervals in a radio communications network. The radio base station 12 is arranged to control the cell 15 serving the user equipment 10.

The radio base station 12 comprises a processing circuit 121 configured to identify the interference situation associated with a transmission time interval, in the cell 15, from a set of interference situations. The processing circuit 121 is further configured to select a correction value associated with the identified interference situation. Additionally, the processing circuit 121 is configured to determine a radio transmission parameter using the selected correction value.

The radio base station 12 further comprises a transmitter 122 configured to transmit information, to the user equipment 10, based on the determined radio transmission parameter.

In some embodiments, the transmitter 122 may further be configured to transmit information being downlink data using the determined radio transmission parameter.

The radio base station 12 may further comprise a receiver 123 configured to receive feedback from the user equipment 10. The feedback indicates whether the transmitted downlink data was correctly received or not at the user equipment 10; and the processing circuit 121 is further configured to update the selected correction value based on the received feedback.

The transmitter 122 may further be configured to transmit information being a message comprising the determined radio transmission parameter enabling the user equipment 10 to transmit uplink data to the radio base station 12 in the transmission time interval.

The receiver 123 may be configured to receive the uplink data from the user equipment 10, said uplink data received in response to the transmitted message including the determined radio transmission parameter. The processing circuit 121 may then be further configured to evaluate the signal strength of the received data or whether the uplink data is received correctly or not; and to update the selected correction value based on a result of the evaluation. The receiver 123 may further be configured to receive e.g. CQI reports or similar from the user equipment 10.

The processing circuit 121 may further be configured to update at least one additional entry of a correction value out of a number of correction values other than the selected correction value.

In some embodiments, the processing circuit 121 may further be configured to select a correction value from a number of correction values associated with different interference situations. The correction value may comprise a Signal to Interference and Noise ratio correction value, a Channel Quality Indicator correction value, and/or a Modulation and Coding Scheme correction value.

The radio base station 12 may further comprise a receiving circuit 124 configured to receive information regarding active cells and/or active user equipments, and/or configured to receive information on a transmission scheme being used by the active cells and/or active user equipments. The processing circuit 121 may then be further configured to identify the interference situation based on the received information. The received information may in some embodiments be received from surrounding radio base stations 14 and/or received from within the radio base station 12. The received information on transmission scheme may comprise a power level, a precoding, a rank and/or a beamforming being used by the active cells and/or active user equipments.

The processing circuit 121 may further be configured to estimate a pathloss to the user equipment 10, and to select, based on the estimated pathloss, an initial correction value. The processing circuit 121 may then further be configured to select the correction value based on a combination of the initial correction value and the identified interference situation.

In some embodiments, the processing circuit 121 may be arranged to identify interference situation from a set of multiple defined situations. The processing circuit 121 may use the selected correction value when computing radio transmission parameters, which radio transmission parameters are used to transmit from the user equipment 10 or the radio base station 12 using a transmitter 122.

The embodiments herein for transmitting data or receiving data to or from the user equipment 10 may be implemented through one or more processors, such as the processing circuit 121 in the radio base station 12 depicted in FIG. 5, together with computer program code for performing the functions and/or method steps of the embodiments herein. The program code mentioned above may also be provided as a computer program product, for instance in the form of a data carrier carrying computer program code for executing the method steps when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

Furthermore, the radio base station 12 may comprise a memory 125, which may comprise one or more memory units and may be used to store for example data such as threshold values, quality values, correction values, indexes, interference situations, transmission parameters, application to perform the methods herein when being executed on the radio base station 12 or similar.

Thus, embodiments herein relate to a radio base station 12 that identifies or predicts interference situation from a set of, multiple defined, interference situations and selects a correction value associated with said situation. The radio base station 12 uses the selected correction value when e.g. computing one or more radio transmission parameters, which one or more transmission parameters is used to transmit from the user equipment 10 or from the radio base station 12.

Figure 6:
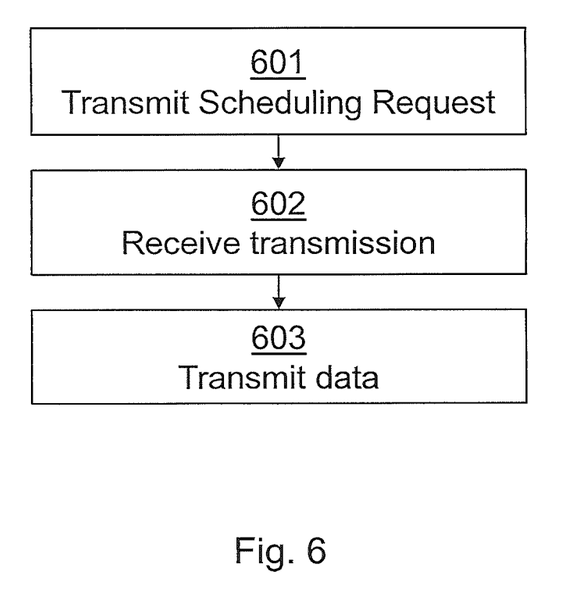
FIG. 6 is a flowchart of a method in a user equipment in accordance with embodiments.

FIG. 6 is a schematic flowchart of a method in a user equipment 10 for communicating with a radio base station 12 over a channel structured in transmission time intervals in a radio communications network.

Step 601. The user equipment 10 transmits a scheduling request to the radio base station 12, which radio base station 12 is described in FIG. 5.

Step 602. The user equipment 10 receives a scheduling grant from the radio base station 12. The scheduling grant indicates a radio transmission parameter. In some embodiments, the user equipment 10 receives a message from the radio base station 12. The message comprises an indication of a radio transmission parameter or parameters. The radio transmission parameter or parameters are used to transmit from the user equipment 10 or from the radio base station 12. The radio transmission parameter or parameters are computed based on a correction value. The correction value is selected based on an identified interference situation associated with a transmission time interval of a set of interference situations. The interference situation is identified by the radio base station 12.

Step 603. The user equipment 10 transmits data to the radio base station 12 using the received radio transmission parameter.

In some embodiments, when the message comprises values or indications of the radio transmission parameter or parameters, the user equipment 10 may use this radio transmission parameter or parameters when performing a transmission.

In some embodiments, the user equipment 10 may also receive a DL transmission from the radio base station 12, which received message is sent from the radio base station 12 using the radio transmission parameter or parameters. The user equipment 10 may then transmit feedback regarding the transmission of the DL transmission.

Figure 7:
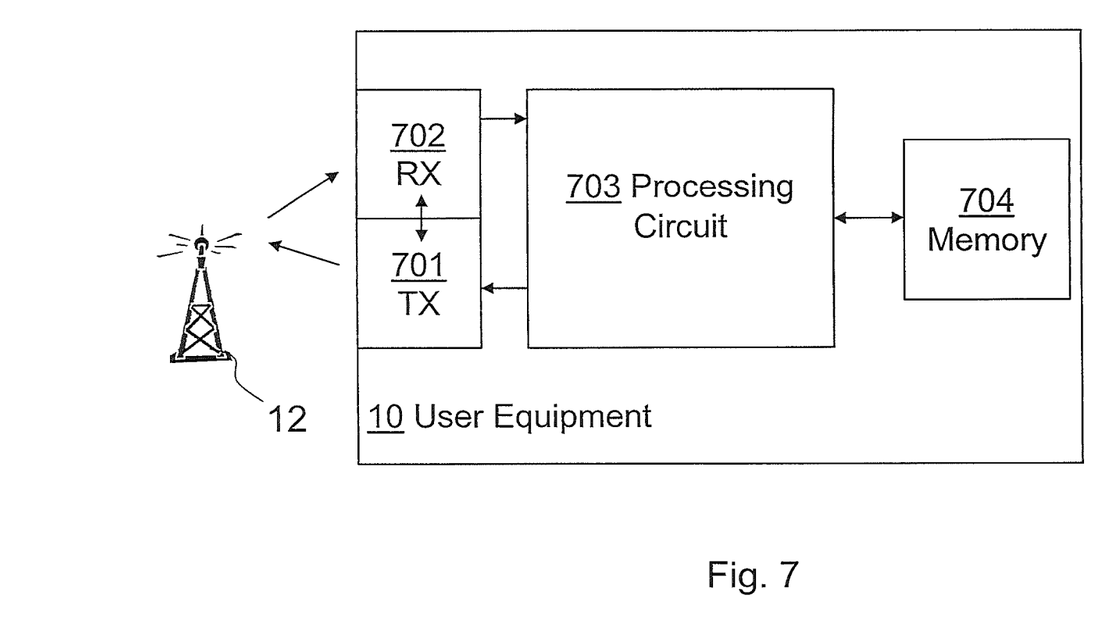
FIG. 7 is a schematic overview of a user equipment in accordance with embodiments.

To perform the method steps above, the user equipment 10 comprises an arrangement depicted in FIG. 7. FIG. 7 is a block diagram depicting a user equipment 10 for communicating with a radio base station 12 over a channel structured in transmission time intervals in a radio communications network.

The user equipment comprises a transmitter 701 configured to transmit a scheduling request to the radio base station 12 according to FIG. 5.

The user equipment 10 further comprises a receiver 702 configured to receive a scheduling grant from the radio base station 12 indicating a radio transmission parameter. The transmitter 701 is further configured to transmit data to the radio base station 12 using the received radio transmission parameter.

The receiver 702 may further be configured to receive a message from the radio base station 12. The message comprises an indication of a radio transmission parameter or parameters. The radio transmission parameter is used to transmit from the user equipment 10 or from the radio base station 12. The radio transmission parameter has been computed based on a correction value. The correction value has been selected based on an identified interference situation, which has been identified by the radio base station 12.

Furthermore, the user equipment 10 may comprise a processing circuit 703 configured to process the message.

The transmitter 701, may be configured to be used, when the message comprises values or indications of the radio transmission parameter, and to use this radio transmission parameter when performing a transmission. In some embodiments, the user equipment 10 may also receive a DL transmission from the radio base station 12, which received message is sent from the radio base station 12 using the radio transmission parameter or parameters. The user equipment 10 may then transmit feedback regarding the transmission of the DL transmission.

The method steps for receiving data from the radio base station 12 may be implemented through one or more processors, such as the processing circuit 703 in the user equipment 10 depicted in FIG. 7, together with computer program code for performing the functions and/or method steps of the embodiments herein. The program code mentioned above may also be provided as a computer program product, for instance in the form of a data carrier carrying computer program code for executing the method steps when being loaded into the user equipment 10. One such carrier may be in the form of a CD ROM disc. It is however feasible with other data carriers such as a memory stick. The computer program code may furthermore be provided as pure program code on a server and downloaded to the user equipment 10.

Furthermore, the user equipment 10 may comprise a memory 704, which may comprise one or more memory units and may be used to store for example data such as, transmission parameters, CQIs, RSRPs, application to perform the methods herein when being executed on the radio base station 12 or similar.

Figure 8:
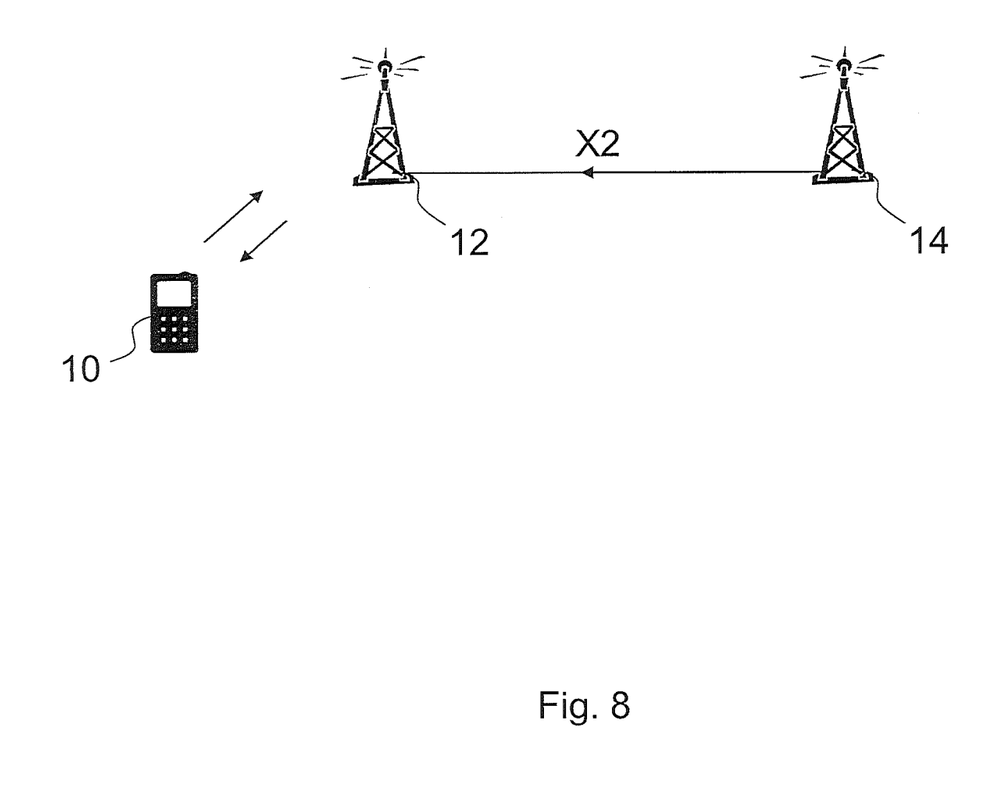
FIG. 8 is a schematic overview of a radio communications network.

FIG. 8 is a schematic overview of a transmission between the first radio base station 12 and the second radio base station 14. In order for the first radio base station 12 to identify the interference situation from a set of interference situations, the first radio base station 12 may in some embodiments receive a message indicating the transmission scheme in the second cell 16 controlled by the second radio base station 14. The message may be transmitted via a low latency communication protocol, e.g. an X2 application protocol.

The message may comprise an indication of an active transmission, transmission rank, beamforming, MU-MIMO, or transmission power for a transmission time interval. For example, the second radio base station 14 may transmit a message indicating with one bit if a TTI is scheduled for transmission with the second cell 16 of the second radio base station 14. The message may further comprise TTI identity and similar.

In the drawings and specification, there have been disclosed exemplary embodiments herein. However, many variations and modifications can be made to these embodiments without substantially departing from the principles of the embodiments. Accordingly, although specific terms are employed, they are used in a generic and descriptive sense only and not for purposes of limitation, the scope of the invention being defined by the following claims.

The invention claimed is:

1. A method in a radio base station for communicating with a user equipment over a channel structured in transmission time intervals in a radio communications network, which user equipment is served in a cell controlled by the radio base station, the method comprising:
identifying an interference situation, associated with a transmission time interval, in the cell from an indexed set of interference situations wherein each interference situation is connected to a correction value via an index;
selecting a correction value connected with the identified interference situation;
determining a radio transmission parameter using the selected correction value; and transmitting information, to the user equipment, based on the determined radio transmission parameter.

2. A method according to claim 1, wherein the transmitting comprises transmitting information as downlink data using the determined radio transmission parameter.

3. A method according to claim 2, wherein the method further comprises:
receiving feedback from the user equipment, which feedback indicates whether the transmitted downlink data was correctly received or not at the user equipment; and
updating the selected correction value based on the received feedback.

4. A method according to claim 1, wherein the transmitting comprises transmitting information as a message comprising the determined radio transmission parameter that is used by the user equipment to transmit uplink data to the radio base station in the transmission time interval.

5. A method according to claim 4, wherein the method further comprises:
receiving the uplink data from the user equipment, said uplink data received in response to the transmitted message including the determined radio transmission parameter;
evaluating whether the uplink data is received correctly or not, or the signal strength of the received data; and
updating the selected correction value based on a result of the evaluation.

6. A method according to claim 3,
wherein the updating of the selected correction value further comprises updating at least one additional entry of a correction value out of a number of correction values other than the selected correction value.

7. A method according to claim 1, wherein the selecting comprises selecting the correction value from a number of correction values associated with different interference situations, and wherein the correction value comprises a Signal to Interference and Noise ratio correction value, a Channel Quality Indicator correction value, and/or a Modulation and Coding Scheme correction value.

8. A method according to claim 1, further comprising:
receiving information regarding active cells and/or active user equipments, and/or receiving information on a transmission scheme being used by the active cells and/or active user equipments,
wherein the identifying of the interference situation is carried out based on the received information.

9. A method according to claim 8, wherein the receiving of information comprises receiving the information from surrounding radio base stations and/or received from within the radio base station.

10. A method according to claim 8, wherein the receiving of information on transmission scheme comprises receiving information identifying a power level, a precoding, a rank and/or a beamforming being used by the active cells and/or active user equipments.

11. A method according to claim 1, further comprising:
estimating a pathloss to the user equipment; and
selecting, based on the estimated pathloss, an initial correction value, and wherein the selecting of a correction value is based on a combination of the initial correction value and the identified interference situation.

12. A radio base station for communicating with a user equipment over a channel structured in transmission time intervals in a radio communications network, the radio base station is arranged to control a cell serving the user equipment, the radio base station comprising:
a processing circuit configured to identify the interference situation, associated with a transmission time interval, in the cell from an indexed set of interference situations, wherein each interference situation is connected with a correction value via an index, to select a correction value connected with the identified interference situation, and to determine a radio transmission parameter using the selected correction value; and
a transmitter configured to transmit information, to the user equipment, based on the determined radio transmission parameter.

13. A radio base station according to claim 12, wherein the transmitter is further configured to transmit information as downlink data using the determined radio transmission parameter.

14. A radio base station according to claim 13, further comprising:
a receiver configured to receive feedback from the user equipment, which feedback indicates whether the transmitted downlink data was correctly received or not at the user equipment; and
wherein the processing circuit is further configured to update the selected correction value based on the received feedback.

15. A radio base station according to claim 12, wherein the transmitter is further configured to transmit information as a message comprising the determined radio transmission parameter that is used by the user equipment to transmit uplink data to the radio base station in the transmission time interval.

16. A radio base station according to claim 15, further comprising:
a receiver configured to receive the uplink data from the user equipment, said uplink data received in response to the transmitted message including the determined radio transmission parameter; and
wherein the processing circuit is further configured to evaluate the signal strength of the received data or whether the uplink data is received correctly or not, and to update the selected correction value based on a result of the evaluation.

17. A radio base station according to claim 13,
wherein the processing circuit is further configured to update at least one additional entry of a correction value out of a number of correction values other than the selected correction value.

18. A radio base station according to claim 12, wherein the processing circuit is further configured to select the correction value from a number of correction values associated with different interference situations, and wherein the correction value comprises a Signal to Interference and Noise ratio correction value, a Channel Quality Indicator correction value, and/or a Modulation and Coding Scheme correction value.

19. A radio base station according to claim 12, further comprising:
a receiving circuit configured to receive information regarding active cells and/or active user equipments, and/or configured to receive information on a transmission scheme being used by the active cells and/or active user equipments; and
wherein the processing circuit is further configured to identify the interference situation based on the received information.

20. A radio base station according to claim 19, wherein the received information is received from surrounding radio base stations and/or received from within the radio base station.

21. A radio base station according to claim 19, wherein the received information on transmission scheme comprises a power level, a precoding, a rank and/or a beamforming being used by the active cells and/or active user equipments.

22. A radio base station according to claim 12, wherein the processing circuit is further configured to estimate a pathloss to the user equipment, and to select, based on the estimated pathloss, an initial correction value, and further configured to select the correction value based on a combination of the initial correction value and the identified interference situation.

* * * * *